April 24, 1951  G. L. C. EARLE  2,550,539
TABLE-TOP MEMBER FOR KITCHEN UNITS
Filed June 21, 1945  2 Sheets—Sheet 1
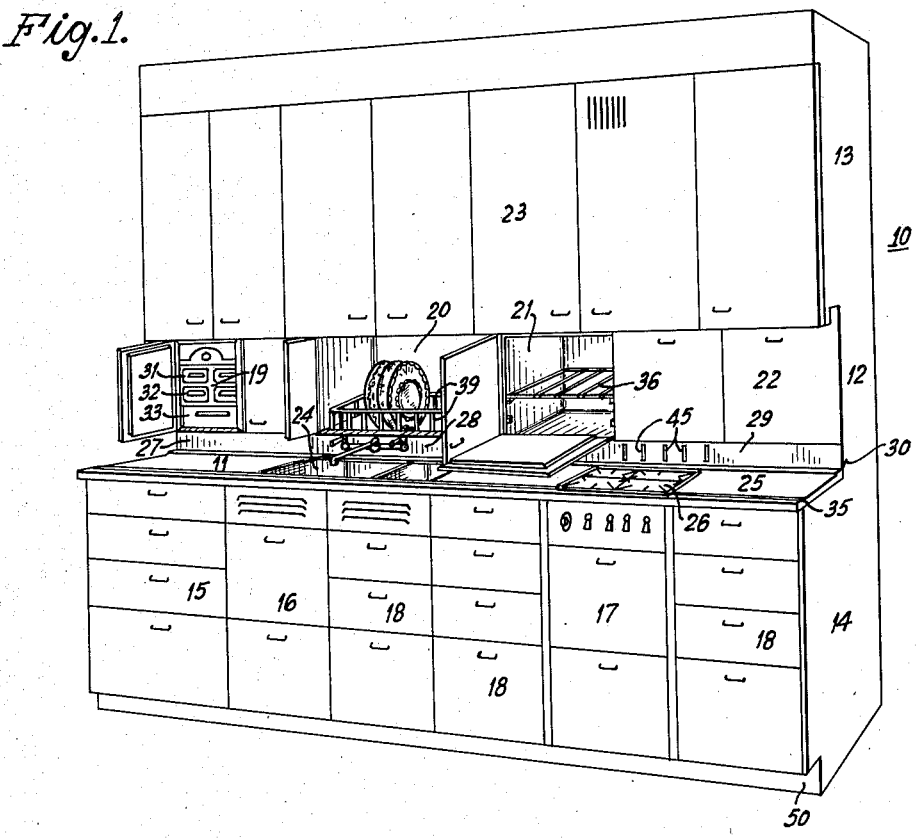
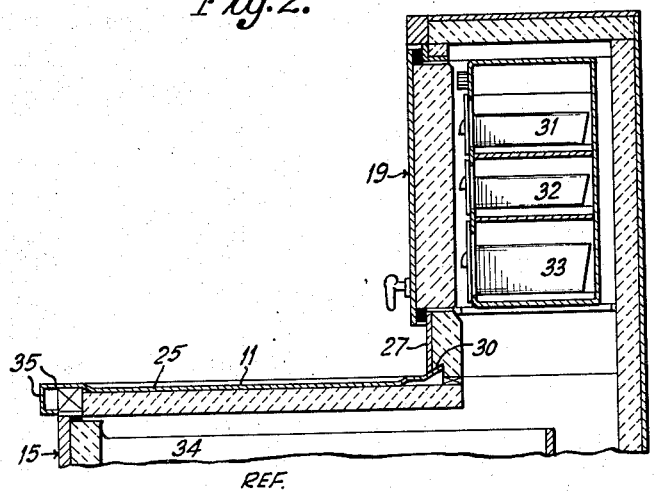
INVENTOR.
GUYON L. C. EARLE
BY Hugh S. Wertz
ATTORNEY

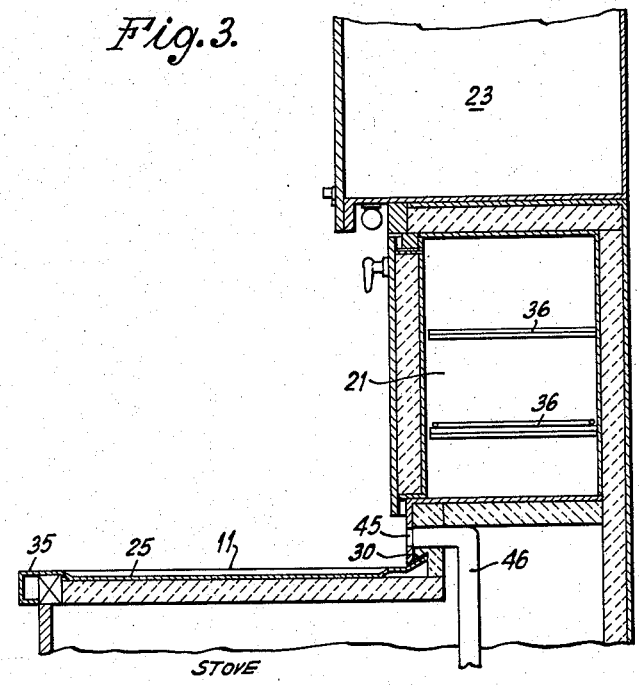
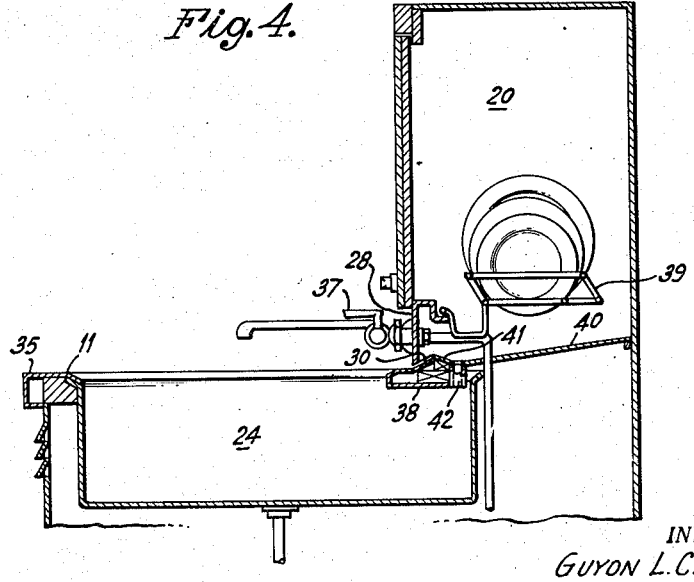

Patented Apr. 24, 1951

2,550,539

UNITED STATES PATENT OFFICE 2,550,539

TABLE-TOP MEMBER FOR KITCHEN UNITS

Guyon L. C. Earle, Forest Hills, N. Y., assignor, by mesne assignments, to Earle Kitchen Unit Corporation, New York, N. Y., a corporation of New York Application June 21, 1945, Serial No. 600,800

2 Claims. (Cl. 4—187)

This invention relates to table-top members and more specifically to table-top members for kitchen units.

It is an object of this invention to provide an improved table-top member for a kitchen unit such as, for example, one including as elements a refrigerator, a sink, a stove and a dish-drying compartment or one or more of these elements.

It is another object of this invention to provide an improved metal table-top member which can be quickly assembled and removed from the kitchen unit of which it forms a part.

It is another object of this invention to provide an improved continuous table-top member for a refrigerator, a sink and a stove positioned adjacent one another.

It is another object of this invention to provide a novel table-top member for a kitchen unit of the "set-back" type, that is, one having an upper portion the front plane of which is placed at the rear of the front plane of the lowermost portion.

In Patent 2,349,541 which was issued May 23, 1944, to Guyon L. C. Earle, there is disclosed a combination kitchen unit of the "set-back" type including a refrigerator, stove, sink, dish and towel drier, table-top and cabinets. The unit includes a lower portion, an intermediate portion and an upper portion, the lower portion comprising the lower parts of the refrigerator and of the stove, the towel drier and the sink, the intermediate portion comprising the upper parts of the stove and refrigerator, the dish drier and cabinets and the upper portion comprising the cabinets, one or more of which may have a flue or flues therein. The table-top member is mounted above the lower portion and in front of the intermediate and may be integral with the sink. The present invention, in one of its most important aspects, relates to an improved table-top and sink member especially adapted for use in a kitchen unit of the type briefly described above.

In accordance with a specific embodiment of the present invention, given by way of example for illustrative purposes, there is provided a table-top member, which may be of one-piece construction adapted to be mounted in front of and over the respective upper and lower portions of a "set-back" refrigerator and in front of and over a "set-back" stove and in front of a dish-drying compartment. A sink is provided in front of the dish-drying compartment and is integral with the table-top member. This table-top member has an upwardly projecting edge which fits under the separate splash members of the refrigerator, dish-dryer and stove in such a way that water will not run up under these splash members. The faucets for the sink project through the splash member of the dish-dryer rather than through the sink and there are no stove connections passing through the table-top member (although there is an opening therein in which burners are positioned). Hence no plumbing adjustments are necessary when it is desired to assemble or remove the table-top member of this invention. It is preferably of stainless steel, aluminum or Monel metal although any other suitable material can be used. The stove oven preferably vents through the splash of the stove unit.

The invention will be more readily understood by referring to the following description taken in connection with the accompanying drawings forming a part thereof, in which:

Fig. 1 is a perspective view of a kitchen unit including stove, refrigerator, dish-dryer and cabinets and the table-top and sink member in accordance with this invention;

Fig. 2 is a vertical partial cross-sectional view taken through the refrigerator;

Fig. 3 is a vertical partial cross-sectional view taken through the stove; and

Fig. 4 is a vertical partial cross-sectional view taken through the dish-dryer.

Referring more specifically to the drawings, Fig. 1 shows by way of example for purposes of explaining the advantages of the invention, a kitchen unit 10 of the "set-back" type employing a table-top and sink member 11 in accordance with the invention. The unit 10 is one in which the front plane of the intermediate portion 12 thereof and the front plane of the upper portion 13 thereof are placed to the rear (or "set-back" from) the front plane of the lower portion 14 of the unit. The lower portion 14 comprises the lower part 15 of a "set-back" refrigerator, the sink and the table-top member 11, a towel drying compartment 16, the lower portion 17 of a "set-back" stove and various cabinets 18. The intermediate portion 12 comprises the upper portion 19 of the refrigerator, a dish-drying compartment 20, the upper portion 21 of the stove, and cabinets 22. The upper portion 13 of the unit comprises shelved cabinets 23. The table-top and sink member 11 includes a sink portion 24, a table-top portion 25 and a cut-out portion to provide space for the burners 26 of the stove. The entire unit preferably rests on a recessed base 27. A complete unit of the type briefly described above (but with a different table-top and sink member) is disclosed in the above-identified Earle patent. A suitable "set-back" refrigerator is disclosed in Earle Patent 2,312,326, issued March 2, 1943, a stove of the "set-back" type is described in Patent 2,180,459, issued November 21, 1939, to the same inventor while Patent 2,328,129 issued August 31, 1943, discloses a dish and towel drying arrangement.

The upper portion 19 of the refrigerator has a vertical splash member 27. Similarly the dish-dryer has a splash member 28 and the stove unit a splash member 29. While the members 27, 28 and 29 may be one continuous member, in practice they are usually separate since the stove, refrigerator and dish-dryer units are made separately. Cooperating with an sliding up under all three of these splash members is the continuous table-top member 11 which has an upturned edge 30 fashioned at such an angle or angles that water on the table-top will not flow under the splash because of the up-grade. The upturned back edge of the table-top will slip under the separate splash members.

In Fig. 2 the table-top member 11 is shown cooperating with the refrigerator unit. This unit has in its upper portion 19 a plurality of ice-cube trays 31, 32 and 33 and in its lower base portion 15 a plurality of drawers 34. The table-top member 11 has a surface 25 over the lower portion 15 and in front of the upper portion 19 which is flat except for the front edge 35 and the upturned rear edge 30. The rear edge preferably attains a higher level than the front edge so that water on the surface 25 will pour onto the floor (where it can be mopped up) rather than under the splash member 27.

The splash member 29 has a function somewhat similar to that of the splash member 27. The former is mounted in front of the upper portion 21 of the stove unit (shown in Fig. 3) which may have an electric heater element (not shown) therein or which may receive heat from the lower portion of the stove or which may be a cabinet for appliances. It is provided with one or more shelves 36. The upturned edge 35 of the table-top member 11 projects under the splash member 29, thus preventing water from getting under the splash. The splash 29 is provided with vents 45 which connect with a pipe 46 leading to the lower stove. This pipe 46 may be connected to the upper compartment 21 instead of to the vent slits 45 if desired.

The splash member 28 for the dish-dryer 20 shown in Fig. 4 is pierced and preferably reinforced for the pipes of the faucets 37 which are not connected in any way to the sink 24. The sink 24 can be punched or otherwise fabricated and later joined to the flat portion 25 of the table-top member 11 by any suitable means. A portion of the sink 24 preferably projects under and to the rear of the splash member 28 and this portion is covered by a top strip 38 which is attached to the upturned edge 30 of the table-top member 11 which projects under the splash 28. The dish-dryer compartment contains one or more racks 39 for dishes and the like. The bottoms 40 and 41 of the compartment 20 are slanted toward a short drainage pipe or passageway 42 which leads into the back of the sink. The front edge 35 of the member 11 is lower than the upturned portion 30 of this member and also lower than the upper part of the pipe or pasageway 42. By this means, if the sink overflows, the water will spill on the floor at the front of the sink rather than flow up into the back of the dish-dryer compartment.

When it is desired to slip the table-top and sink member 11 into position, it is necessary only to slip the upturned edge 30 in the openings under each of the flanges 27, 28 and 29 and then secure the member 11 by any suitable means. When it seems advisable to replace the table-top 11 or remove for repairs one or more of the elements making up the kitchen unit 10, the table-top member 11 can be removed without disengaging any plumbing. Moreover the table-top and sink member 11 make a simple, sanitary junction with the refrigerator, dish-dryer and stove and ties these various elements together.

Various changes can be made in the embodiment described above without departing from the spirit of the invention, the scope of which is indicated by the appended claims.

What is claimed is:

1. A dish-dryer and sink cabinet combination comprising a lower base cabinet portion having a sink therein, an upper portion including a dish-drying compartment the front plane of which portion is positioned to the rear of the front plane of the lower portion, said upper portion having a vertical splash member in the region of the top of said lower portion and a faucet projecting through said splash member and extending forwardly therefrom over the sink, and a table-top member attached to the upper front and side edges of said sink and having an upturned edge attached to the upper rear portion of said sink and which edge fits under said splash member to prevent water on said table-top member or in said sink from flowing under said splash member, said upturned edge being at an angle with respect to the table-top member which is much less than a right angle, whereby said table-top member can be put on and taken off without disengaging the faucet.

2. A dish-dryer and sink cabinet combination comprising a lower base cabinet portion having a sink therein, an upper portion including a dish-dryer compartment the front plane of which portion is positioned to the rear of the front plane of the lower portion, said upper portion having a vertical splash member in the region of the top of said lower portion and a faucet projecting through said splash member and extending forwardly therefrom over the sink, and a table-top member attached to the upper front and side edges of said sink and having an upturned edge attached to the upper rear portion of said sink and which edge fits under said splash member to prevent water on said table-top member or in said sink from flowing under said splash member, said upturned edge being at an angle with respect to the table-top member which is much less than a right angle, whereby said table-top member can be put on and taken off without disengaging the faucet, said dish-drying compartment having a sloping bottom and a pasageway from said bottom to the rear of said sink, the top of said passageway being higher than the portion of said table-top member in front of said sink, whereby water in said sink overflows at the front thereof rather than into said dish-drying compartment.

GUYON L. C. EARLE.

REFERENCES CITED

The following references are of record in the file of this patent:

UNITED STATES PATENTS

| Number | Name | Date |
|---|---|---|
| 1,246,313 | Otte | Nov. 13, 1917 |
| 1,860,617 | Krause | May 31, 1932 |
| 1,972,628 | Lindemann et al. | Sept. 4, 1934 |
| 2,010,790 | Sakier | Aug. 6, 1935 |
| 2,090,665 | Carter | Aug. 24, 1937 |
| 2,143,039 | Stoddard | Jan. 10, 1939 |
| 2,312,326 | Earle | Mar. 2, 1943 |
| 2,328,129 | Earle | Aug. 31, 1943 |